United States Patent
Gleine (10) Patent No.: US 6,844,817 B2
(45) Date of Patent: Jan. 18, 2005

(54) AIRCRAFT ANTI-TERRORISM SECURITY SYSTEM

(75) Inventor: Wolfgang Gleine, Kakenstorf (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/253,273

(22) Filed: Sep. 23, 2002

(65) Prior Publication Data

US 2003/0058112 A1 Mar. 27, 2003

(30) Foreign Application Priority Data

Sep. 21, 2001 (DE) .......................................... 101 46 657

(51) Int. Cl.$^7$ .......................... G08B 13/00; B64D 11/00
(52) U.S. Cl. ...................... 340/574; 340/945; 340/541; 244/118.5
(58) Field of Search ................................ 340/574, 945, 340/541, 425.16; 244/118.5; 180/268

(56) References Cited

U.S. PATENT DOCUMENTS

| | | | | | |
|---|---|---|---|---|---|
| 3,658,277 A | * | 4/1972 | Anderson | ..................... | 244/1 R |
| 3,811,643 A | * | 5/1974 | Pizzo | ..................... | 244/137.2 |
| 3,898,472 A | * | 8/1975 | Long | ..................... | 180/270 |
| 4,651,157 A | * | 3/1987 | Gray et al. | ..................... | 342/457 |
| 4,797,657 A | * | 1/1989 | Vorzimmer et al. | ..................... | 340/541 |
| 4,816,828 A | * | 3/1989 | Feher | ..................... | 340/945 |
| 5,599,082 A | * | 2/1997 | Mlakar et al. | ..................... | 312/409 |
| 5,808,661 A | * | 9/1998 | Infiesto et al. | ..................... | 348/14.01 |
| 5,905,436 A | * | 5/1999 | Dwight et al. | ..................... | 340/573.1 |
| 6,408,391 B1 | * | 6/2002 | Huff et al. | ..................... | 713/201 |
| 6,448,907 B1 | * | 9/2002 | Naclerio | ..................... | 340/945 |
| 6,474,599 B1 | * | 11/2002 | Stomski | ..................... | 244/118.5 |
| 6,542,077 B2 | * | 4/2003 | Joao | ..................... | 340/426.16 |
| 6,659,401 B1 | * | 12/2003 | Semprini | ..................... | 244/118.5 |
| 6,696,979 B2 | * | 2/2004 | Manten et al. | ..................... | 244/118.5 |
| 2002/0158166 A1 | * | 10/2002 | Lin | ..................... | 244/118.5 |
| 2003/0047648 A1 | * | 3/2003 | Batt et al. | ..................... | 244/118.5 |
| 2003/0050745 A1 | * | 3/2003 | Orton | ..................... | 701/3 |
| 2003/0052225 A1 | * | 3/2003 | Butzlaff | ..................... | 244/118.5 |
| 2003/0052226 A1 | * | 3/2003 | Allen | ..................... | 244/118.5 |
| 2003/0052227 A1 | * | 3/2003 | Pittman | ..................... | 244/118.5 |
| 2003/0052779 A1 | * | 3/2003 | Martin et al. | ..................... | 340/541 |

* cited by examiner

Primary Examiner—Jeffery Hofsass
Assistant Examiner—Anne V. Lai
(74) Attorney, Agent, or Firm—W. F. Fasse; W. G. Fasse (57) ABSTRACT

In an aircraft cabin floor adjacent to the cockpit, a trap door opens downwardly into a security cell, to trap a terrorist trying to enter the cockpit. Two walls with lockable airtight doors bound a safety buffer cabin between the cockpit and the passenger cabin. Sensors like seat occupancy sensors, motion detectors, video cameras and microphones provide data regarding the location, movement and activities of passengers to a system that evaluates the data to recognize unusual data situations indicating one or more escalation levels of suspicious or aggressive actions by passengers. Alarm signals and terrorist countermeasure devices such as fogging or tranquilizer gas generators, noise generators, high intensity blinding/glaring lights, a cabin lighting master shut-off, window darkening devices, and tranquilizer dart guns are actuated automatically by the evaluation system, or manually by a cockpit input device or a portable signaling device carried by a flight attendant.

47 Claims, 3 Drawing Sheets

AIRCRAFT ANTI-TERRORISM SECURITY SYSTEM

PRIORITY CLAIM

This application is based on and claims the priority under 35 U.S.C. §119 of German Patent Application 101 46 657.9, filed on Sep. 21, 2001, the entire disclosure of which is incorporated herein by reference.

FIELD OF THE INVENTION

The invention relates to a system of measures in an aircraft to counter or hinder terrorist or hijacking activities in the aircraft.

BACKGROUND INFORMATION

Despite security screening of all passengers prior to boarding an aircraft, and security surveillance measures carried out in airports, it still remains possible for terrorists or hijackers, even carrying weapons of various types, to board a passenger transport aircraft. Once on board, a terrorist or hijacker has relatively easy access to the entire passenger cabin space as well as the cockpit, and can therefore rather easily take over control of the aircraft. Conventional commercial aircraft include very little, or essentially no, effective measures to prevent or at least hinder the takeover of the aircraft by a terrorist or hijacker.

Increased security measures on the ground will presumably make it more difficult for terrorists to smuggle diverse weapons on board an aircraft, for use in the hijacking of the aircraft or other violent or aggressive actions. Nonetheless, it seems that a group of terrorists with close combat or hand-to-hand combat training may be able to board and commandeer a conventional aircraft, even without generally recognizable weapons, such as guns, knives, explosives, or the like. Instead, such trained terrorists can use common everyday items of clothing or the like (e.g. a belt, shoelaces, writing pens, or the like) to threaten, restrain, injure, or even kill members of the flight crew or passengers and thereby forcefully and violently gain control of the aircraft.

A conventional countermeasure against such terrorist or hijacking activities involves placing armed security personnel, so-called "sky marshals", on commercial aircraft flights. There has also been public discussion about training and arming pilots or other members of the flight crew. Such security measures, however, are based on the assumption that there will necessarily be a violent armed conflict involving the discharge of firearms and the like between the terrorists and the armed crew members or sky marshals. That in itself is a dangerous situation, which should preferably be avoided, because it can easily, accidentally lead to the injury or death of innocent bystander passengers, as well as critical damage to the aircraft airframe structure or onboard systems of the aircraft, which means a high risk of a crash of the aircraft, even if the terrorists can be subdued.

SUMMARY OF THE INVENTION

In view of the above, it is an object of the invention to provide a system of measures in a commercial passenger transport aircraft, to monitor the activities of persons within the aircraft, to recognize unusual or aggressive activities quickly after their instigation, and to effectively counter or suppress the further carrying out of such aggressive activities, without causing life-threatening risks for the aircraft passengers or for uninvolved third parties. The invention further aims to avoid or overcome the disadvantages of the prior art, and to achieve additional advantages, as apparent from the present specification. The attainment of these objects, however, is not a required limitation of the present invention.

The above objects have been achieved according to a first embodiment feature of the invention, in an aircraft having a cockpit, a passenger cabin, and a safety buffer zone cabin between the cockpit and the passenger cabin. A reinforced or armored cockpit wall separates the cockpit from the safety buffer zone cabin, and a reinforced or armored cabin divider wall (or security wall) separates the safety buffer zone cabin from the passenger cabin. A respective selectively openable and closeable reinforced armored door is provided in the cockpit wall and in the cabin divider wall. If terrorists wish to gain forced entry into the cockpit, they must first enter the safety buffer zone cabin. Once the terrorists are in the buffer zone cabin, the cabin divider door can be automatically or manually closed and securely locked by a door locking bolt device, and the cockpit door is similarly securely locked or bolted. The terrorists are thus locked into the safety buffer zone cabin. Further preferably, the safety buffer zone cabin is closeable in an airtight hermetically sealed manner, and equipped with various terrorist suppression measures, such as a high intensity blinding or glaring light (e.g. a strobe light or a laser), a noise generator (e.g. a high intensity loudspeaker or pneumatic horn), and/or a gas injection nozzle that injects a fog gas or a knock-out gas (e.g. "sleeping gas", tranquilizer gas, "laughing gas", or irritant gas) from a corresponding gas source into the hermetically closed safety buffer zone cabin.

The above objects have further been achieved according to a second embodiment feature of the invention in an aircraft having a cockpit and a cabin area separated from each other by a reinforced or armored cockpit wall, provided with a reinforced or armored cockpit door. An automatically openable trap door is provided in the floor of the cabin area directly below and aft of the cockpit door. A reinforced or armored security cell is arranged in the below-deck area, e.g. in the cargo hold, of the aircraft directly under the trap door arrangement. The security cell is completely enclosed and preferably reinforced and/or armored to withstand the discharge of firearms or explosives. In the event terrorists are attempting to gain forced entry to the cockpit through the cockpit door, the trap door will be automatically or electronically opened, so that the terrorists fall down into the security cell, whereupon the trap door automatically closes and is locked in the closed position. The security cell may be equipped with suppression measures as mentioned above.

The above objects have still further been achieved according to a third embodiment of the invention in an aircraft having a cockpit and a cabin area separated from each other by a cockpit wall with a selectively openable and closeable cockpit door arranged therein. The inventive system in this context includes an information acquisition unit and an information evaluation unit which are connected for signal transmission so as to exchange information therebetween, as well as an operating unit and an alarm unit that are respectively connected to each other and to the information evaluation unit. The alarm unit receives evaluated information or signals from the information evaluation unit and responsively thereto triggers an acoustic or optical warning signal through one or more respective acoustic or optical warning signal device. (e.g. a warning buzzer, beeper, bell, loudspeaker, light, display panel, or the like). At least one of the acoustic warning signal devices and at least one of the optical warning signal devices are arranged in the cockpit, and at least one of the former devices and at least one of the latter devices are arranged in the cabin area. The operating unit receives evaluated information or signals from the information evaluation unit and responsively thereto releases corresponding control commands to one or more countermeasures arranged in the cabin area, whereby these countermeasures then responsively carry out one or more allocated functions to counter, hinder, or suppress violent or aggressive activities of terrorists. Throughout this specification, the term "terrorist" will be used in a general sense, to identify any person who carries out violent, aggressive or illegal actions on the aircraft, which actions are to be countered, hindered, or suppressed.

The warning signal information can also be provided from the alarm unit to an aircraft antenna and/or a voice recorder and/or a video recorder so as to transmit the warning signal information externally out of the aircraft to a ground station by radio transmission, or to record the acoustic and/or optical warning signal information in the respective recorders.

According to further detailed features of the invention, the countermeasure devices may include a cockpit door locking bolt device, a master shut-off switch for switching off all of the cabin illumination, a high intensity blinding or glaring light source such as a strobe light or a laser directed into the cabin area, a window darkening device for darkening the cabin windows, a noise generator such as a high intensity loudspeaker or a pneumatic horn for directing noise into the cabin area, gas injector nozzles for injecting a fog gas or a knock-out gas (e.g. sleeping gas, tranquilizer gas, irritant gas, or laughing gas) into the cabin area, a tranquilizer dart gun, and an infrared or night-vision camera for monitoring the cabin area even in complete darkness.

A plurality of sensors are also arranged in the cabin area and are connected to at least one of the information acquisition unit and the operating unit. These sensors monitor the activities of persons in the cabin area and provide the respective sensed information to the information acquisition unit to be evaluated therein, or to the operating unit to directly trigger the activation of one of the countermeasures. These sensors, for example, include a seat occupancy or load sensor arranged in each passenger seat, a seat belt buckle status indicator provided for each passenger seatbelt buckle, a manual alarm activation button provided in each passenger seat, an arrangement of motion sensors to detect passenger movement in the cabin area, and a portable remote signaling device which can be carried by a flight attendant and can be activated to emit a signal (e.g. an infrared signal or a radio signal) that is received by the information acquisition unit to responsively trigger the alarm unit and/or the operating unit.

The various sensors are active throughout a flight of the aircraft, to monitor the activities or behavior of the passengers within the cabin area. The sensor data received in the information acquisition unit is provided to the information evaluation unit, in which the information is evaluated to determine the existence of any violent or unusual activity. For example, the received information is subjected to a comparison of actual data values relative to stored nominal or usual data values or ranges. When the actual values fall outside of the usual ranges, e.g. exceeding certain thresholds, then the alarm unit and/or the operating unit are triggered responsively thereto. For example, if a number of passengers in excess of some threshold number opens their respective seat belt buckles and/or stands up from their respective passenger seats in a defined short interval of time, as sensed by the seat occupancy sensors and the seat belt buckle status sensors, and then a number of passengers greater than some threshold number is detected to be moving forward toward the cockpit, as sensed by the motion sensors, then an alarm signal may be triggered. As another example, if the speed of forward motion of one or more persons along an aisle in the cabin area exceeds a prescribed threshold, or if one or more persons enter the safety buffer zone, then an alarm may be triggered. An alarm may also be triggered in the judgement of the flight crew personnel, for example by activating an alarm using the portable remote signaling device. When a higher escalation level of aggressive activity is detected, or upon a manual activation command from a cockpit trigger device or the portable remote signaling device, then the operating unit will be electrically or electronically triggered to activate selected countermeasures as discussed above.

DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
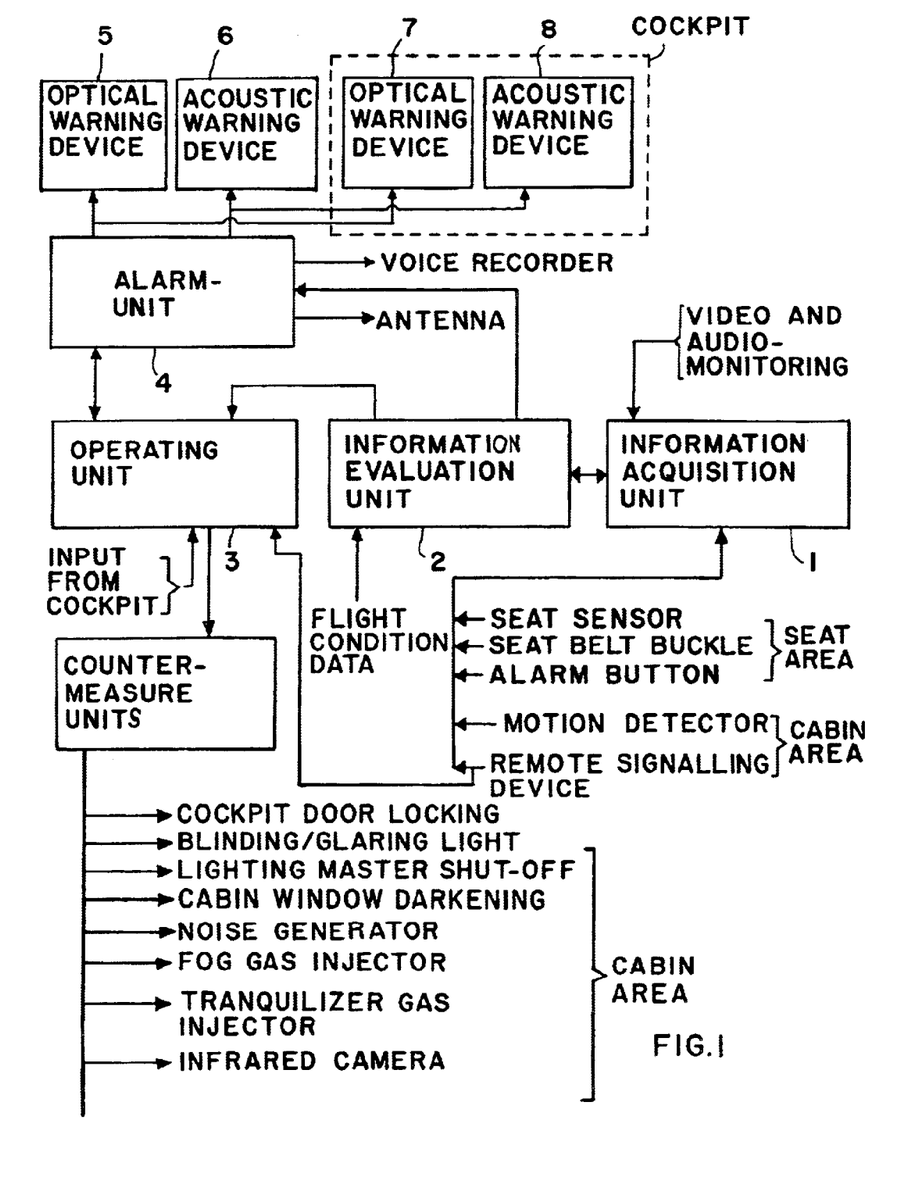
FIG. 1 is a schematic block diagram of important components of the security system according to the invention.
Figure 2:
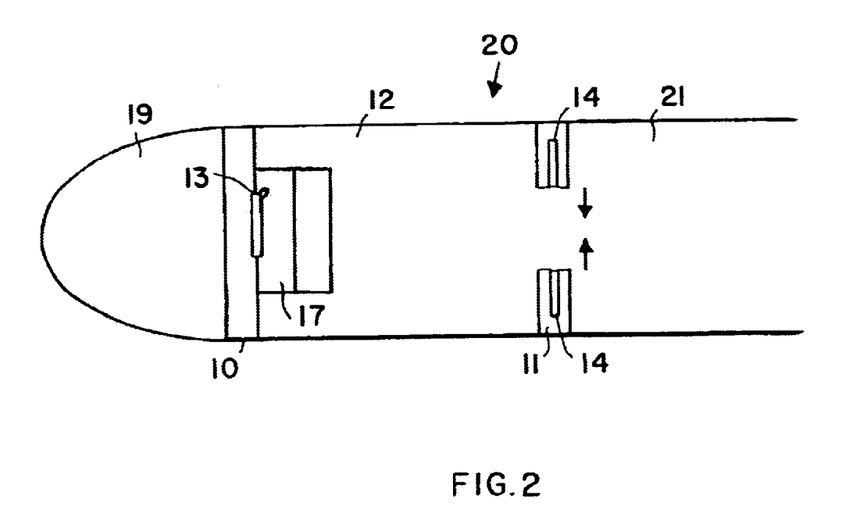
FIG. 2 is a top view schematic diagram of a cockpit, a safety buffer zone cabin, and a passenger cabin in an aircraft.
Figure 3:
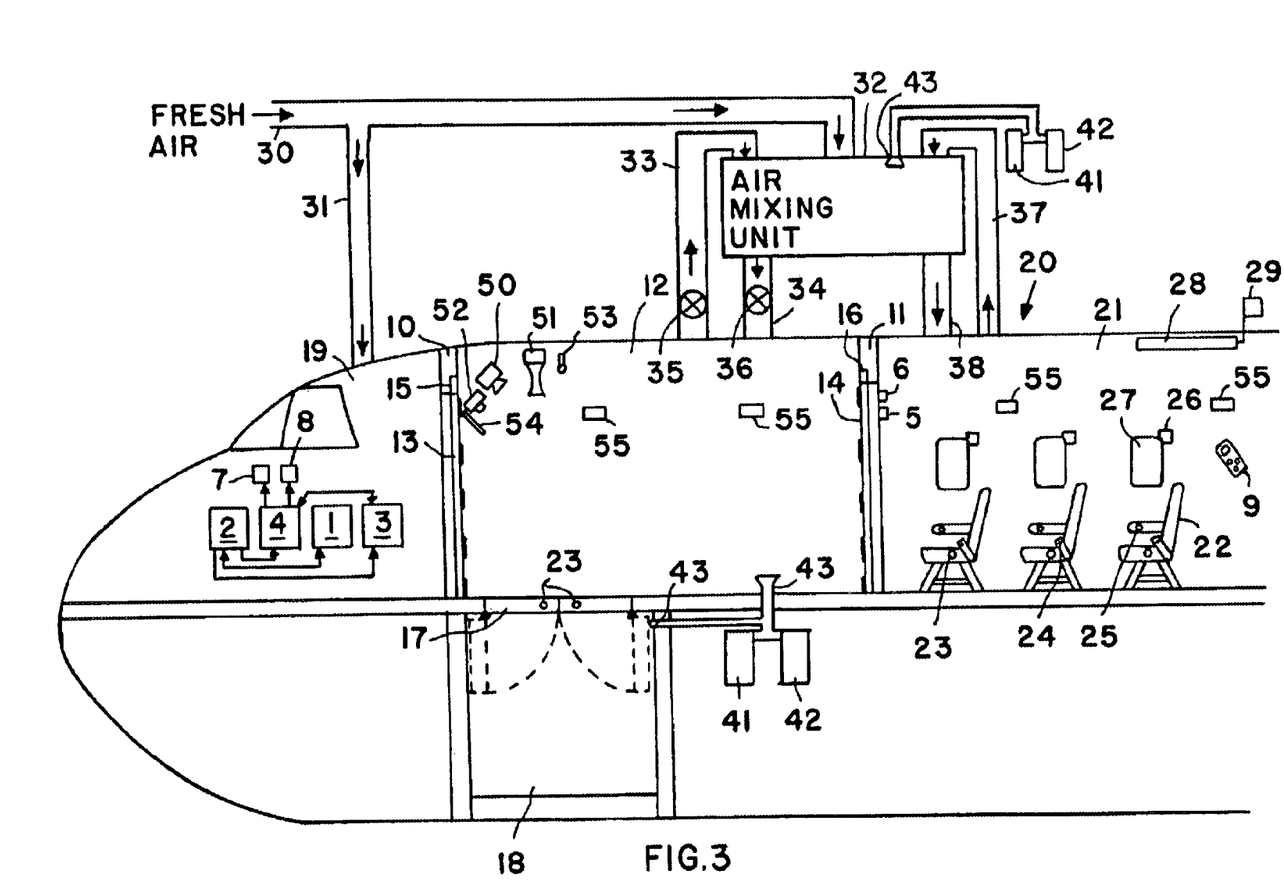
FIG. 3 is a schematic side view of the aircraft according to FIG. 2, showing components of the inventive security system arranged therein.

The major components of the aircraft cabin security system comprise an information evaluation and monitoring system including an information acquisition unit 1, an information evaluation unit 2, an operating unit 3, and an alarm unit 4, as well as various sensors (which will be described in detail below) connected to inputs of the information acquisition unit 1, optical warning signal devices 5 and 7 connected to outputs of the alarm unit 4, acoustic warning signal devices 6 and 8 connected to outputs of alarm unit 4, and various countermeasure devices or terrorist suppression devices (to be described in detail below) connected to one or more outputs of the operating unit 3 to carry out terrorist suppression or countermeasure functions for hindering or suppressing aggressive activities of persons on board of an aircraft that would endanger the safety of persons or the aircraft. The general arrangement and interconnection of the various components is schematically illustrated in the block diagram of FIG. 1. An example arrangement of the components in an aircraft is schematically shown in FIGS. 2 and 3. Each of the units can respectively comprise any circuitry and/or software known or designable by a person skilled in the art, for achieving the respective stated functions.

Generally, the information acquisition unit 1 continuously receives information from several sensors and from operation of one or more signal input devices. The information received by the information acquisition unit 1 generally represents the status and the change of various conditions within the aircraft cabin, which relate to the security of the cabin and the activities, location, and movement of persons in the cabin. This information can be used to determine the possibility of violent, aggressive or dangerous activities that can endanger the safety of the aircraft or its passengers and crew. The information is evaluated, to determine the existence or likelihood of various dangerous or violent activities, by the information evaluation unit 2, which receives the acquired information from the sensors via the information acquisition unit 1, and receives data regarding the flight operating condition, e.g. from the flight control computer or from the cockpit input devices. Relevant sensors, as summarized in FIG. 1 and schematically shown in FIG. 3, include the following.

Each passenger seat 22 in the passenger cabin 21 is equipped with a seat occupancy sensor 23, such as a pressure or load sensor arranged in the seat bottom thereof, to sense whether the respective seat is occupied by a person. Additionally or alternatively, each passenger seat 22 is equipped with a seat belt buckle status sensor 24 that senses whether the belt buckle is buckled (closed) or unbuckled (opened), e.g. by using the metal buckle components to complete or break an electrical circuit. Also, each seat 22 may be equipped with a passenger alarm button 25, or the like, allowing each individual passenger to signal a perceived dangerous situation. Each alarm button 25 is provided with a double safety feature, such as a safety cover, or a dual button safety interlock, to prevent inadvertent or casual activation of the alarm button.

One or more portable remote signaling devices 9 may be provided to be carried by crew members while they carry out their duties within the passenger cabin 21. The remote signaling device 9 transmits signals, e.g. by infrared or radio wave transmission, to a suitable receiver connected to the information acquisition unit 1. By inputting an activation code or the like, and depressing an associated button or similarly activating a specific alarm function on the remote signaling device 9, a crew member can directly trigger an alarm to be released by the alarm unit 4. Also, by activating an associated function via the signaling device 9, a crew member can directly trigger the activation of at least a limited set of the terrorist countermeasures or suppression devices through the operating unit 3 as will be described below. These steps can be taken based on the crew member's direct observation of an aggressive activity or dangerous situation.

Motion detectors 55 are arranged throughout the passenger cabin, to sense the motion of passengers within the cabin, and are especially arranged (e.g. on the cabin sidewalls) to sense and measure the motion of persons in a forward-aft longitudinal direction along aisles of the passenger cabin. Also arranged in the cabin are one or more video cameras 52, and one or more audio microphones 53, of which the video and audio signals are provided to the information acquisition unit 1, to be automatically evaluated, and can be provided to a video display screen and a loudspeaker in the cockpit 19, to be monitored by the pilot and other members of the flight crew. The video camera 52 is preferably equipped with or supplemented by an infrared sensor or other "night vision" sensor for providing a video monitoring signal of the persons and activities in the cabin 20, 21, 12 even under conditions of complete darkness (i.e. insufficient light in the visible spectrum for ordinary vision).

All of the sensors are connected for signal transmission to the information acquisition unit 1 in any known manner, e.g. by electrical conductors, fiber optic cables, a radio transmitter and receiver, an infrared transmitter and receiver, or the like. The various cabin status information signals are received in the information acquisition unit 1, preprocessed to the extent necessary for uniformalization, or are digitized for example, and are then provided further to the information evaluation unit 2, where the acquired information or data is compared with stored nominal or standard information of a knowledge-based information database, by means of comparison logic circuitry and/or software. Through such comparison, the information evaluation unit 2 is able to determine, in several successive likelihood or escalation stages, whether an aggressive activity or dangerous situation is occurring in the cabin.

The information evaluation is generally based on the comparison of the actual sensed information values or data, with previously determined and stored normal and abnormal data values. For example, in a normal situation during a particular flight phase, e.g. during cruise flight, the number, timing, patterns and speed of passengers standing up from their respective seats and moving along the aisles of the passenger cabin is previously determined and stored as a normal reference data set. For example, in the normal cruise flight situation, individual passengers get up from their seats only sporadically and infrequently, for example to go to a lavatory or restroom. During a flight, the information evaluation unit 2 constantly receives information from the seat occupancy sensors 23, the seat belt buckle status sensors 24, the motion detectors 55 and the video camera(s) 52, regarding the seating status and/or movement of passengers throughout the cabin. If the received information remains within acceptable limits of the above mentioned normal reference data set, then no alarm indication is triggered.

On the other hand, if a number of passengers exceeding an allowable threshold number, stands up from their respective seats in a pre-defined short time interval, and moves forward through the cabin 20, 21, 12, this will be evaluated by the information evaluation unit 2 as indicating a possible dangerous situation. As a result, the information evaluation unit 2 will provide a signal to the alarm unit 4, which correspondingly triggers optical and acoustic warning signals through the optical warning signal device 5 and the acoustic warning signal device 6 provided in the cabin 20, 21, 12, as well as the optical warning signal device 7 and the acoustic warning signal device 8 arranged in the cockpit 19. A release switch may be provided adjacent to the warning signal devices 5, 6 in the cabin 20, 21, 12, which must be actuated before the other warning signal devices 7, 8 in the cockpit 19 become active. Simultaneously, the same alarm signal is sent to a cockpit voice recorder and/or video recorder to be recorded, and is also sent to an aircraft antenna from which the signal is transmitted by a radio wave transmission to a ground station, e.g. at any nearby airport.

The alarm signal may be indicative of any respective applicable one of several urgency or escalation levels, e.g., advance warning of possible dangerous situation requiring further monitoring, imminent aggressive or dangerous situation, and aggressive or dangerous situation actually taking place. The appropriate one of the several escalation levels of the alarm signal is triggered automatically by the outcome of the information evaluation in the information evaluation unit 2, e.g. by the actual data values exceeding different threshold levels. For example, the number of persons standing up from their seats substantially simultaneously, the location and grouping of these persons, and/or the speed at which these persons move forward in the cabin, can be used as criteria for determining the appropriate escalation level of the perceived aggressive situation, and therewith the appropriate escalation level of the alarm signal.

Some detected information immediately triggers the highest escalation level alarm signal. An example is an acoustic signal received by the audio microphone 53, corresponding to a sound pressure peak representative of a gunshot or an explosion. A further example of sensor information that would immediately trigger the highest level alarm signal is a video signal provided by the camera 52, which is indicative or representative of several (e.g. three or more) people bunched together and fighting or grappling in a close combat situation. The information evaluation unit 2 includes appropriate image evaluation software, to automatically recognize such unusual situations in the video image signal.

The flight condition data is also relevant to the determination of the appropriate escalation level. The evaluation in the information evaluation unit 2 takes into account the actual current flight phase, and applies different evaluation criteria during different flight phases. For example, during take-off and landing and other flight phases in which passengers are required to be seated with their seatbelt buckles securely fastened, sensor information indicating that even a single passenger has stood up from his or her seat and is moving through the cabin may trigger a low level alarm signal calling for direct observation or monitoring by the flight attendants. On the other hand, during cruise flight in which passengers may freely walk about the cabin, the occurrence of a single passenger standing up and moving along the aisle would not trigger any alarm signal.

Alternatively, the appropriate escalation level can be directly input by a crew member using alarm signal input devices provided in the cockpit 19, or via the portable remote signaling devices 9 carried by the flight attendants and other crew members.

To further improve the ability to recognize abnormal movements of persons throughout the cabin, the invention further proposes to avoid the arrangement of lavatories or restrooms or other passenger facilities close to the cockpit, because the restrooms are the primary destination and reason for passengers to walk along the cabin aisles. Preferably, restrooms should not be located in the forward one quarter, or even in the forward one third of the longitudinal length of the aircraft cabin. With such an arrangement, the movement of passengers in the forward direction at a location forward of the forward-most restroom, and especially forward of the seat from which the passenger stood up, would be regarded immediately as suspicious or requiring further direct observation or monitoring.

In the event that the information evaluation unit 2 determines the existence of a dangerous situation or aggressive activity of sufficient intensity or escalation level, or when triggered by an emergency signal input from the cockpit 19 or from one of the portable remote signaling devices 9, the alarm unit 4 as well as the operating unit 3 are activated by corresponding output signals from the information evaluation unit 2. Depending on and responsive to the alarm and activation triggering signal, the alarm unit 4 will activate different levels of warning signals through the warning signal devices 5, 6, 7 and 8. These signals will simultaneously be recorded on a video and/or audio recorder, and transmitted out of the aircraft from a radio antenna, as described above. The pilot and other flight crew members are thereby alerted to carry out a visual and acoustic monitoring of the aircraft cabin 20, 21, 12, for example by means of the signals provided by the video camera 52 and the audio microphone 53. Based on such observations, the flight crew can then trigger the operating unit 3 to activate appropriate terrorist suppression or countermeasure devices. Such devices can also be automatically activated when corresponding defined escalation threshold levels are exceeded by the actual measured sensor signals in the information evaluation unit 2. Then, depending on the nature, urgency, and escalation intensity of the particular violent activity or dangerous situation that is occurring, different ones or combinations of the terrorist suppression or countermeasure devices will be activated. The countermeasure devices are all power actuated and connected via suitable electrical or electronic circuitry through any known type of transmission connection to the operating unit 3. The transmission connection can, for example, involve a hard-wired connection through electrical conductors or fiber optic cables, or a wireless connection using radio or infrared transmitters and receivers.

These terrorist suppression and countermeasure devices and actions include the following. As a simplest or lowest level measure, the cockpit door 13 is automatically double-locked or double-bolted by a cockpit door locking bolt device 15, to increase the security and impenetrability of the reinforced or armored cockpit door 13. Various measures can be activated to disorient the terrorists, and/or to make communication among the terrorists more difficult, and/or to make the movement of the terrorists through the cabin more difficult. Along these lines, the operating unit 3 will activate a master shut-off 29, which switches off all of the cabin lighting 28. To further ensure that the cabin is brought into complete darkness, the operating unit 3 activates window darkening devices 26 respectively associated with the cabin windows 27. These window darkening devices 26 may be motorized or automatic drives for closing mechanical window blinds over the windows, or may involve electro-optical or electro-chromic films or the like that are electrically switched to a darkened or opaque state. Thereby, the window darkening devices 26 and the cabin lighting master shut-off 29 together achieve a sudden darkening or blackening of the entire aircraft cabin 20, 21, 12. In order to allow the flight crew to maintain visual observation of the cabin environment, the camera 52 is switched to infrared or "night vision" operation with a suitable sensor.

As an additional obscuring or disorienting measure, a fogging gas can be suddenly injected into the cabin, or a partial space thereof, from a fogging gas source 41 through a gas injection nozzle 43. The fogging gas source 41 may be a compressed gas bottle, or a chemical gas generator. The gas injection nozzle 43 may be arranged to inject the gas directly into the cabin 20, 21, 12 or a portion thereof, or to inject the gas into the air conditioning recirculation system. This fogging of the cabin can be carried out in a sudden manner, and can then be rapidly discontinued and cleared out through the normal ventilation system once the fogged condition is no longer desired by the flight crew.

Additional active measures can achieve a further disorientation, communication-interruption, irritation, and sensory-overload of the terrorists. High intensity blinding or glaring lights 50, such as strobe lights or lasers, can be triggered by the operating unit 3. Loud irritating noise is emitted from noise generators 51, such as high intensity loudspeakers, whistles, sirens, or pneumatic horns. A tranquilizer dart gun 54 can shoot tranquilizer darts, preferably being remotely aimed together with the movable video camera 52, so that the tranquilizer darts can be fired, e.g. pneumatically or mechanically, with high targeting accuracy, for example by joystick manipulation of the orientation of the video camera 52 together with the dart gun 54. The darts of the dart gun 54 are loaded with any known tranquilizer in a suitable dose for tranquilizing an adult male of typical body weight.

As a further measure to entirely incapacitate the terrorists, a knock-out gas, e.g. a sleeping gas, tranquilizer gas, laughing gas, irritant gas, or asphyxiant gas, can be introduced from a corresponding gas source 42, such as a compressed gas bottle or chemical gas generator. This gas can be injected through the gas injection nozzle or nozzles 43, directly into the cabin 20, 21, 12 or a partial space thereof, or into the air conditioning and recirculation system.

To provide a physical restraint of the terrorists, a trap door 17 (including one or more door panels) is arranged in the cabin floor directly below and aft from the cockpit door 13, as shown in FIG. 3. This trap door 17 opens into a security cell 18 arranged in the below-deck space, e.g. in the cargo hold, of the aircraft. The walls, floor and ceiling of the security cell 18 are preferably reinforced or armored to withstand the discharge of a firearm or an explosive. Preferably, the weakest or least blast-resistant side of the enclosure provided by the security cell 18 is the floor thereof along the fuselage belly. In the event an explosive is detonated in the security cell 18, the explosion will thus tend to be directed outward out of the aircraft through the floor of the security cell 18, without causing any blast damage within the aircraft fuselage. For this purpose, the trap door 17 is also reinforced to withstand an explosive blast, and is hermetically sealable. The door 17 is automatically opened and closed by any conventionally known actuators, which are triggered or operated by corresponding signals from the operating unit 3. Thus, if terrorists are trying to make a forced entry through the cockpit door 13 into the cockpit 19, they necessarily must stand on top of the trap door 17. Once the terrorists are in this position, the trap door 17 is instantaneously opened downwardly, so that the terrorists fall into the security cell 18, whereupon the trap door 17 immediately swings closed and is locked and sealed in the closed condition. The terrorists are thereby locked in the security cell 18. A gas injection nozzle 43 also leads into the security cell 18, so that a fogging gas can be provided by the fogging gas source 41, or a knock-out gas can be provided from the knock-out gas source 42 directly into the security cell 18.

All of the above described terrorist suppression or countermeasure devices are linked to the operating unit 3 via an electrical or electronic circuit connected by hard-wired conductors or by a radio transmission link or by an infrared transmission link, or the like. The devices are actuated responsive to the actuation signals received from the operating unit 3, by any suitable electrical, electronic or mechanical actuators.

A further feature of the invention, as schematically represented in FIGS. 2 and 3, is to provide a separate, hermetically closeable safety buffer zone cabin 12 between the cockpit 19 and the passenger seating cabin 21 in the overall cabin space 20 of the aircraft. The safety buffer zone cabin 12 is separated from the cockpit 19 by a reinforced or armored cockpit wall 10, in which the armored or reinforced cockpit door 13 is arranged. On the other hand, the safety buffer zone cabin 12 is separated from the passenger seating cabin 21 by an armored or reinforced cabin divider or security wall 11 in which an armored or reinforced cabin divider or security door 14 is arranged. In the example of FIG. 2, the cockpit door 13 is a hinged pivoting door, which swings outward from the cockpit 19 into the safety buffer zone cabin 12 to be opened. On the other hand, the cabin divider door 14 is a sliding door, with two opposed door panels that slide laterally toward each other from cavities in the call 11 to close the door opening. FIG. 3 shows a swinging embodiment of door 14. These doors 13 and 14 may be manually operable and/or operated by automatic power actuators of any conventionally known design.

In any event, if terrorists wish to gain entry to the cockpit 19, they must first enter the safety buffer zone cabin 12. Thus, the buffer zone cabin 12 provides two types of additional protection. If the cabin divider doors 14 are closed before the terrorists enter the buffer zone cabin 12, then the terrorists must first force through the security doors 14 before being able to reach the cockpit door 13. This is an extra level of security for the cockpit 19. On the other hand, if the terrorists have already entered the safety buffer zone cabin 12 while the doors 14 are open, then the cabin divider doors 14 will be closed automatically and suddenly behind the terrorists, to lock the terrorists into the safety buffer zone cabin 12. Thereby, the terrorists may be more effectively suppressed or countered by the suppression and countermeasure devices described above, being utilized in a confined, hermetically sealed space.

As shown in FIG. 3, various sensors and countermeasure devices can be arranged particularly in the hermetically sealable safety buffer zone cabin 12 for suppressing the terrorists. For example, the high intensity blinding or glaring lights 50, the noise generators 51, and the gas introduction nozzles 43 can be arranged to be effective especially in the safety buffer zone cabin 12. For additional security, the safety buffer zone cabin 12 preferably has no cabin windows and no restrooms therein, and preferably does not even have any passenger seats therein. Thus, the safety buffer zone cabin 12 can be used as the boarding area, a forward galley area, onboard baggage storage and closet space, and the like. Alternatively, it is also possible to provide passenger seating with normal cabin windows and the like, in this safety buffer zone cabin 12. Preferably, the safety buffer zone cabin is of limited size, e.g. having a longitudinal length of 4 meters or less.

The safety buffer zone cabin 12 can be securely closed and locked, and hermetically sealed by the cockpit door 13 (which is securely locked and bolted by the cockpit door locking bolt device 15) and the cabin divider door 14 (which is securely locked and bolted by the cabin divider door locking bolt device 16). These doors, and the cabin ceiling, walls and floor, are embodied to be airtight, so that a knock-out gas provided by the gas source 42 through the gas injection nozzles 43 can be contained within the safety buffer zone cabin 12.

To help ensure that the knock-out gas does not get into the remainder of the passenger seating cabin 21, or especially into the cockpit 19, the air recirculation and air conditioning system is arranged as schematically shown in FIG. 3. Particularly, compressed fresh outside air, e.g. cooled engine bleed air, is supplied through a fresh air supply duct or pipe 30 to an air mixing unit 32. At a point sufficiently upstream from the air mixing unit 32 to prevent any backflow, a fresh air branch duct 31 leads directly to the cockpit 19, to ensure a constant supply of unadulterated fresh air into the cockpit 19. On the other hand, the air mixing unit receives the fresh air from the supply duct 30 in addition to cabin recirculation air through a recirculation air return duct 37 from the passenger cabin 21, and through a recirculation air return duct 32 from the safety buffer zone cabin 12. After mixing the recirculation air with the fresh air, the air mixing unit 32 provides mixed air through a mixed air supply duct 34 into the safety buffer zone cabin 12, and through a mixed air supply duct 38 into the passenger cabin 21.

In the event of a terrorist activity or dangerous situation being sensed and evaluated by the security system or by a direct input from the flight crew, air shut-off devices 35 and 36, such as valves, flaps, or dampers are closed in the air ducts 33 and 34 connected to the safety buffer zone cabin 12. Thereby, a fogging gas or knock-out gas introduced by the gas injection nozzle 43 directly into the safety buffer zone cabin 12 can be hermetically enclosed and contained within the safety buffer zone cabin 12, while maintaining a normal air supply to the cockpit 19 and to the passenger seating cabin 21.

Alternatively, it may be desired to flood the entire aircraft cabin 20, including the safety buffer zone cabin 12 and the passenger seating cabin 21, with a fogging gas from a gas source 41 or a knock-out gas from a gas source 42 injected through an injection nozzle 43 into the air mixing unit 32, or into any other location of the air recirculation system. Thereby, the air recirculation system distributes the gas throughout the cabin 20.

In any case, the air supply system is preferably so arranged and configured to establish a slight over-pressure in the cockpit 19 relative to the cabin 20, to ensure that there is no leakage or counterflow of gas into the cockpit 19. An alternative or additional safety measure is to provide gas protection masks or pure air supply masks for the cockpit personnel to put on before the activation of the knock-out gas system. The air supply arrangements are only schematically shown as a simplified example.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft having a fuselage, a floor in said fuselage, a below-deck space in said fuselage below said floor, a cockpit in said fuselage above said floor, a cabin in said fuselage adjacent to said cockpit above said floor, a cockpit wall separating said cockpit from said cabin, and a cockpit door arranged in said cockpit wall to selectively open or close a passage through said cockpit wall between said cabin and said cockpit, an improvement comprising:

an enclosed security cell arranged below said floor in said below-deck space at a location adjacent to and extending aft from said cockpit door, wherein said security cell is large enough and adapted to receive and confine a person therein;

a trap door arrangement including a trap door arranged in said floor in said cabin at a location adjacent to and extending aft from said cockpit door, and a power actuator connected to said trap door to actuate said trap door to selectively open or close a passage through said floor from said cabin into said security cell; and at least one feature selected from the ground consisting of:

a first feature wherein said security cell is structurally strong to withstand a firearm discharge and a bomb explosion, and a second feature wherein said security cell is airtight, said trap door is hermetically sealed when closed, and said improvement further comprises a knock-out gas source providing a knock-out gas, and a gas nozzle connected to said knock-out gas source and arranged in said security cell to introduce said knock-out gas into said security cell.

2. The improvement in the aircraft according to claim 1, comprising said second feature wherein said security cell is airtight, said trap door is hermetically sealed when closed, and said improvement further comprises said knock-out gas source providing said knock-out gas, and said gas nozzle connected to said knock-out gas source and arranged in said security cell to introduce said knock-out gas into said security cell.

3. The improvement in the aircraft according to claim 1, comprising said first feature wherein said security cell is structurally strong to withstand a firearm discharge and a bomb explosion.

4. In an aircraft having a fuselage, a cockpit in said fuselage, a cabin in said fuselage adjacent to said cockpit, a cockpit wall separating said cockpit from said cabin, and a cockpit door arranged in said cockpit wall to selectively open or close a passage through said cockpit wall between said cabin and said cockpit, an improvement comprising:

a security wall arranged spaced apart from and parallel to said cockpit wall in said cabin so as to separate said cabin into a safety buffer zone cabin between said cockpit wall and said security wall, and a passenger seating cabin on a side of said security wall opposite said safety buffer zone cabin;

a security door arranged in said security wall to selectively open or close a passage through said security wall between said passenger seating cabin and said safety buffer zone cabin;

a power actuator connected to said security door to actuate said security door to selectively open or close said security door; and passenger seats installed in said passenger seating cabin; and wherein there is no passenger seat and no restroom and no other passenger service facility in said safety buffer zone cabin; and wherein said cockpit door is hermetically sealed in a closed position thereof, said security door is hermetically sealed in a closed position thereof, said cockpit wall is airtight, said security wall is airtight, and said safety buffer zone cabin can be hermetically sealed when said cockpit door and said security door are closed, and further comprising a knock-out gas source providing a knockout gas, and a cam nozzle connected to said knock-out gas source and arranged to introduce said knock-out gas into said safety buffer zone cabin.

5. The improvement in the aircraft according to claim 4, further comprising a pneumatic horn arranged in said safety buffer zone cabin.

6. The improvement in the aircraft according to claim 4, further comprising a high-intensity strobe light arranged in said safety buffer zone cabin.

7. The improvement in the aircraft according to claim 4, further comprising an infrared video camera arranged in said safety buffer zone cabin.

8. The improvement in the aircraft according to claim 4, further comprising a tranquilizer dart gun arranged in said safety buffer zone cabin.

9. In a passenger transport aircraft having a fuselage, a cockpit in said fuselage, a cabin area in said fuselage adjacent to said cockpit, a cockpit wall separating said cockpit from said cabin area, and a cockpit door arranged in said cockpit wall to selectively open or close a passage through said cockpit wall between said cabin area and said cockpit, an improvement comprising a security system for monitoring activities and carrying out preventive measures against aggressive activities of persons in said cabin area, said security system comprising:

plural sensors that are arranged in said cabin area and that are adapted to sense activities or behavior of persons in said cabin area and to provide corresponding sensor signals dependent on and indicative of said activities or behavior;

an information evaluation and monitoring system having at least one information input, at least one alarm signal output, and at least one actuating signal output, wherein said sensors are connected in a signal transmitting manner to said at least one information input of said information evaluation and monitoring system to provide said sensor signals thereto, and wherein said information evaluation and monitoring system is adapted to evaluate said sensor signals so as to evaluate said activities or behavior and to output at least one alarm signal and/or at least one actuating signal responsively thereto at said at least one alarm signal output and/or said at least one actuating signal output respectively;

a first optical warning signal device and a first acoustic warning signal device adapted to emit optical and acoustic warning signals respectively, arranged in said cabin area, and connected in a signal receiving manner to said at least one alarm signal output;

a second optical warning signal device and a second acoustic warning signal device adapted to emit optical and acoustic warning signals respectively, arranged in said cockpit, and connected in a signal receiving manner to said at least one alarm signal output; and plural countermeasures adapted to prevent or hinder aggressive activities of persons in said cabin area, arranged in said cabin area, and connected in a signal receiving manner to said at least one actuating signal output.

10. The improvement in the aircraft according to claim 9, wherein said information evaluation and monitoring system comprises:

an information acquisition unit having said at least one information input and an acquired data output;

an information evaluation unit including at least one of data evaluation logic circuitry and data evaluation software, a data input connected in a signal receiving manner to said acquired data output of said information acquisition unit, and at least one evaluated data output;

an alarm unit having said at least one alarm signal output, an input connected in a signal receiving manner to said at least one evaluated data output, and a cross-connection; and an operating unit having said at least one actuating signal output, an input connected in a aignal receiving manner to said at least one evaluated data output, and a cross-connection connected in a signal transmitting and receiving manner to said cross-connection of said alarm unit.

11. The improvement in the aircraft according to claim 10, wherein said operating unit further has a manual actuation input connected to a manual actuation input signal device arranged in said cockpit, to manually trigger actuation of said countermeasures.

12. The improvement in the aircraft according to claim 10, wherein said information evaluation unit further comprises a flight data input via which said information evaluation unit receives flight data regarding flight operating parameters of said aircraft, a stored set of nominal data values, and an evaluation logic that compares actual data received via said data input from said acquired data output of said information acquisition unit and said flight data with said stored set of nominal data values, to determine whether a critical threshold value of said nominal data values has been exceeded, and responsively thereto providing a corresponding signal via said at least one evaluated data output.

13. The improvement in the aircraft according to claim 9, wherein said security system further comprises a release element that is arranged in said cabin area adjacent to said first optical warning signal device and said first acoustic warning signal device, and that is connected to said information evaluation and monitoring System and must be operated to activate said second optical warning signal device and said second acoustic warning signal device.

14. The improvement in the aircraft according to claim 9, wherein said aircraft further includes a cabin lighting system and cabin windows arranged in said cabin area, and wherein said countermeasures include at least one countermeasure selected from the group consisting of an automatic power actuated cockpit door locking device that selectively locks said cockpit door in a closed position in said cockpit wall, a cabin lighting master shut-off connected to said cabin lighting system to selectively shut-off all lighting in said cabin area, window darkening devices arranged on said cabin windows to selectively darken said cabin windows, a high intensity glaring or blinding light unit arranged in said cabin area, a high intensity noise generator arranged in said cabin area, and a gas source arranged to selectively introduce a gas into said cabin area.

15. The improvement in the aircraft according to claim 14, wherein said countermeasures include all of said countermeasures recited in said group.

16. The improvement in the aircraft according to claim 14, wherein said countermeasures include said cockpit door locking device, which selectively locks said cockpit door in said closed position in a hermetically sealed and mechanically secure manner.

17. The improvement in the aircraft according to claim 14, wherein said countermeasures include said cabin lighting master shut-off.

18. The improvement in the aircraft according to claim 14, wherein said countermeasures include said high intensity glaring or blinding light unit.

19. The improvement in the aircraft according to claim 18, wherein said high intensity glaring or blinding light unit comprises a high intensity strobe light.

20. The improvement in the aircraft according to claim 14, wherein said countermeasures include said window darkening devices.

21. The improvement in the aircraft according to claim 20, wherein said window darkening devices comprise automatic power actuated window shades arranged on said cabin windows.

22. The improvement in the aircraft according to claim 20, wherein said window darkening devices comprise electro-optic or electro-chromic films arranged on said cabin windows.

23. The improvement in the aircraft according to claim 14, wherein said countermeasures include said high intensity noise generator.

24. The improvement in the aircraft according to claim 23, wherein said noise generator comprises a pneumatic horn.

25. The improvement in the aircraft according to claim 14, wherein said countermeasures include said gas source, and a gas injection nozzle connected to said gas source and arranged in said cabin area to introduce said gain directly into said cabin area.

26. The improvement in the aircraft according to claim 14, wherein said aircraft further includes an air conditioning and recirculation system, and wherein said countermeasures include said gas source, and a gas injection nozzle connected to said gas source and arranged in said air conditioning and recirculation system to introduce said gas indirectly into said cabin area via said air conditioning and recirculation system.

27. The improvement in the aircraft according to claim 14, wherein said countermeasures include said gas source, which is a source of a fogging gas.

28. The improvement in the aircraft according to claim 14, wherein said countermeasures include said gas source, which is a source of a knock-out gas.

29. The improvement in the aircraft according to claim 9, wherein said countermeasures include a tranquilizer dart gun arranged in said cabin area.

30. The improvement in the aircraft according to claim 9, wherein said aircraft further includes a below-deck space and a cabin floor separating said cabin area from said below-deck space, and wherein said countermeasures include an enclosed security cell arranged in said below-deck space, a trap door arranged in said cabin floor adjacent to said cockpit door to selectively open or close a passage from said cabin area through said cabin floor into said security cell, and a power actuator connected to said trap door and connected to said at least one actuating signal output of said information evaluation and monitoring system so as to actuate an opening and closing of said trap door responsive to an actuating signal from said actuating signal output.

31. The improvement in the aircraft according to claim 30, wherein said security cell is explosion proof and hermetically sealed when said trap door is cloned, and said countermeasures further comprise a knock-out gas source arranged to selectively introduce a knock-out gas into said security call.

32. The improvement in the aircraft according to claim 9, wherein said sensors include a night-vision device arranged in said cabin area.

33. The improvement in the aircraft according to claim 32, wherein said night-vision device comprises an infrared camera.

34. The improvement in the aircraft according to claim 32, wherein said night-vision device is controllably orientable, and said countermeasures further include a tranquilizer dart gun connected to said night-vision device, so that said tranquilizer dart gun can be oriented and aimed in connection with said night-vision device.

35. The improvement in the aircraft according to claim 9, wherein said security system further comprises a portable remote signaling device that is freely movably portable in said cabin area, that is connected by an infrared or radio transmission link to said information evaluation and monitoring system, and that can be manually operated to send a signal to said information evaluation and monitoring system to selectively activate said warning signal devices and said countermeasures.

36. The improvement in the aircraft according to claim 9, wherein said aircraft further includes passenger seats in said cabin area, and wherein said sensors include seat occupancy sensors arranged on said passenger seats respectively to sense whether a person is seated in a respective one of said seats.

37. The improvement in the aircraft according to claim 36, wherein said Beat occupancy sensors respectively comprise pressure sensors or load sensors.

38. The improvement in the aircraft according to claim 36, wherein said information evaluation and monitoring system contains stored information representing an acceptable threshold number of persons who may leave their respective assigned ones of said passenger seats in said cabin area in a prescribed time interval, and said information evaluation and monitoring system further comprises a comparator arrangement adapted to compare said sensor signals from said seat occupancy sensors with said stored information and to output said at least one alarm signal responsively if said sensor signals indicate said acceptable threshold number has been exceeded.

39. The improvement in the aircraft according to claim 9, wherein said aircraft further includes passenger seats with seat belts and seat belt buckles in said cabin area, and wherein said sensors include seat belt buckle status sensors arranged on said seat belt buckles to sense whether said seat belt buckles are respectively buckled or unbuckled.

40. The improvement in the aircraft according to claim 9, wherein said aircraft further includes passenger seats in said cabin area and passenger alarm buttons arranged on said passenger seats and connected to said information evaluation and monitoring system, and wherein said passenger alarm buttons can be respectively manually depressed to send an alarm signal to said information evaluation and monitoring system.

41. The improvement in the aircraft according to claim 9, wherein said sensors include motion detectors arranged in said cabin area to sense forward and aft motion of persona in said cabin area.

42. The improvement in the aircraft according to claim 41, wherein said information evaluation and monitoring system contains stored information representing an acceptable threshold speed of at least one person moving forward along an aisle in said cabin area toward said cockpit, and said information evaluation and monitoring system further comprises a comparator arrangement adapted to compare said sensor signals from said motion detectors with said stored information and to output said at least one alarm signal responsively if said sensor signals indicate said acceptable threshold speed has been exceeded.

43. The improvement in the aircraft according to claim 9, wherein said sensors include a video camera and an audio microphone arranged in said cabin area.

44. The improvement in the aircraft according to claim 9, further comprising a voice and/or video recorder connected to said at least one alarm signal output of said information evaluation and monitoring system to record an alarm signal, and an external transmitting antenna connected to said at least one alarm signal output of said information evaluation and monitoring system to transmit an alarm signal externally from said aircraft.

45. The improvement in the aircraft according to claim 9, further comprising a security wall with a security door therein, spaced apart from and extending parallel to said cockpit wall in said cabin area so as to separate said cabin area into a passenger seating cabin and a safety buffer zone cabin between said passenger seating cabin and said cockpit, and further comprising a powered door actuator connected to said security door and to said at least one actuating signal output of said information evaluation and monitoring system so as to selectively open and close said security door.

46. The improvement in the aircraft according to claim 45, wherein said Security door is hinged to said security wall to swing into said safety buffer zone cabin, and said powered door actuator is arranged in said security door.

47. The improvement in the aircraft according to claim 45, wherein said security door is a sliding or rolling door that slides or rolls into or out of a cavity in said security wall, and said powered door actuator is arranged in or on an upright edge of said security door inside said cavity in said security wall.

* * * * *

UNITED STATES PATENT AND TRADEMARK OFFICE
CERTIFICATE OF CORRECTION

PATENT NO.   : 6,844,817 B2
DATED        : January 18, 2005
INVENTOR(S)  : Gleine It is certified that error appears in the above-identified patent and that said Letters Patent is hereby corrected as shown below:

Column 2,
Line 58, before "as", replace "veil", by -- well --.

Column 12,
Line 37, before "nozzle", replace "cam", by -- gas --.

Column 13,
Line 46, before "receiving", replace "aignal", by -- signal --.

Column 14,
Line 6, after "monitoring", replace "System", by -- system --.

Column 15,
Line 58, after "said", replace "Beat", by -- seat --.

Column 16,
Line 22, after "of", replace "persona" by -- persons --;
Line 57, before "door", replace "Security" by -- security --.

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,844,817 B2
APPLICATION NO. : 10/253273
DATED : January 18, 2005
INVENTOR(S) : Gleine It is certified that error appears in the above-identified patent and that said Letters Patent is hereby corrected as shown below:

Column 2,
Line 64, after "signal", replace "device." by --devices--;

Column 4,
Line 17, before "DESCRIPTION", insert --BRIEF--;
Line 43, after "outputs of", insert --the--;

Column 11,
Line 49, after "from the", replace "ground" by --group--;

Column 14,
Line 59, after "introduce said", replace "gain" by --gas--;

Column 15,
Line 26, after "door is", replace "cloned" by --closed--;
Line 29, after "security", replace "call" by --cell--.

Signed and Sealed this

Fifth Day of January, 2010

David J. Kappos
*Director of the United States Patent and Trademark Office*